United States Patent [19]
Frei

[11] Patent Number: 5,324,190
[45] Date of Patent: Jun. 28, 1994

[54] INJECTION MOULD FOR MANUFACTURING DISC-SHAPED PLASTIC ARTICLES

[75] Inventor: Jürg Frei, Dübendorf, Switzerland
[73] Assignee: GPT Axxicon B.V., Netherlands
[21] Appl. No.: 916,830
[22] PCT Filed: Nov. 8, 1991
[86] PCT No.: PCT/NL91/00225
§ 371 Date: Sep. 8, 1992
§ 102(e) Date: Sep. 8, 1992
[87] PCT Pub. No.: WO92/08597
PCT Pub. Date: May 29, 1992

[30] Foreign Application Priority Data
Nov. 9, 1990 [JP] Japan ............... 2-305618

[51] Int. Cl.$^5$ ............... B29C 45/20
[52] U.S. Cl. ............... 425/549; 264/107; 264/334; 425/556; 425/562; 425/810
[58] Field of Search ............... 425/549, 562, 563, 564, 425/565, 566, 556, 577, 810; 264/334, 107

[56] References Cited

U.S. PATENT DOCUMENTS

| | | | |
|---|---|---|---|
| 2,777,164 | 1/1957 | Strahm | 425/577 |
| 4,340,353 | 7/1982 | Mayer | 425/563 |
| 4,900,560 | 2/1990 | Trakas | 425/549 |
| 4,938,681 | 7/1990 | Gellert | 425/549 |
| 4,961,884 | 10/1990 | Watanabe et al. | 425/810 |

FOREIGN PATENT DOCUMENTS

| | | | |
|---|---|---|---|
| 0051252 | 5/1982 | European Pat. Off. | B29F 1/022 |
| 0075043 | 3/1983 | European Pat. Off. | B29F 1/022 |
| 2336236 | 7/1977 | France | B29F 1/06 |
| 1071340 | 5/1967 | United Kingdom . | |

OTHER PUBLICATIONS
Hackh's Chemical Dictionary, 1969, p. 663.

*Primary Examiner*—Tim Heitbrink
*Attorney, Agent, or Firm*—Willian Brinks Hofer Gilson & Lione

[57] ABSTRACT

An injection mould for manufacturing disc-shaped plastic articles with a central hole comprises a first mould part and a second mould part displaceable relative to the first mould part by a first displacing mechanism. The two mould parts are displaceable between a closed first position, in which they together partially bound a mould cavity corresponding to the shape of an article for manufacture, and an open second position in which a formed article can be removed. A third mould part is provided which, in the closed position of the first and second mould parts, extends through the mould cavity and has a shape in the region of the mould cavity which corresponds to the shape of the central hole. The third mould part is axially displaceable by a guide sleeve forming part of the first mould part between a first position, in which it partially forms a bounding of the mould cavity, and a second retracted position. The third mould part bounds a channel that is connectable at a free outside end to an injection nozzle of an injection moulding device. At the other side, the third mould part debouches with an injection inlet into the region of the mould cavity in the first position of the first and the second mould parts and the first position of the third mould part. In the second position, the third mould part debouches blind against the inner wall of the guide sleeve. A heater for keeping plastic present in the channel in the plastic state is also provided.

10 Claims, 4 Drawing Sheets

INJECTION MOULD FOR MANUFACTURING DISC-SHAPED PLASTIC ARTICLES

BACKGROUND OF THE INVENTION

Injection moulds exist which are equipped for manufacturing disc-shaped articles with a central hole. Examples of this are compact discs, VLPs, laser discs and other information carriers. Such known moulds are of the two-part type and bound in closed position a disc-shaped mould cavity. After the injection moulding treatment the central hole is removed from the formed article by means of a punching process.

The drawback to this known art is that in this way valuable plastic is lost and that the quality of the hole is greatly dependent on the accuracy with which the punching process is performed, in particular the moment during the manufacturing cycle at which the actual punching takes place.

SUMMARY OF THE INVENTION

In order to always obtain disc-shaped articles with a central hole of excellent and fully controllable quality without loss of material, the invention provides an injection mould for manufacturing disc-shaped plastic articles with a. central hole, which mould comprises:
  a first mould part;
  a second mould part displaceable relative to the first mould part by means of first displacing means;
  which two mould parts are displaceable between a closed first position, in which they together partially bound a mould cavity corresponding to the shape of an article for manufacture, and an open second position in which a formed article can be taken out;
  a third mould part which in the closed position of the first and second mould parts extends through the mould cavity defined thereby and in the region of this mould cavity has a shape corresponding to the shape of the central hole, which third mould part is coaxially displaceable by means of second displacing means by means of a guide sleeve forming part of the first mould part between a first position, in which it partially forms a bounding of the mould cavity and a retracted second position;
    which third mould part bounds a channel, that is connectable at its free outside end to the injection nozzle of an injection moulding device and at the other side debouches with an injection inlet into the region of the mould cavity in the first position of the first and the second mould parts and the first position of the third mould part, and in the second position of the third mould part debouches blind against the inner wall of the guide sleeve; and
  heating means for keeping plastic present in the channel in the plastic state.

To ensure that the zone around the central hole does not shrink fixedly during cooling round the third mould part use can be made of an embodiment having the characteristic that the third mould part has a releasing form in the region of the mould cavity during moving of the third mould part from the first to the second position.

Existing moulds have an ejector for ejecting the central sprue of a formed article after it has been punched out. Use can be made of this existing configuration within the framework of the invention. For this purpose the invention provides a mould of the said type having the feature that the second displacing means comprise an ejector extending through the second mould part.

A very good quality of the plastic article is assured with an embodiment in which the injection inlet comprises a number of peripherally ordered injection inlet openings.

A completely homogenous inflow pattern of the heated plastic into the moulded cavity is assured with an embodiment with the feature that the injection inlet is embodied as an injection inlet opening extending around the entire periphery of the third mould part.

It is important to ensure that in the retracted, non-operational state of the third mould part the plastic present in the channel does not cool. To that end the device preferably displays the characteristic that the third mould part comprises a first heating element.

For the best possible flow pattern and a homogenous heating of the plastic in the third mould part the special feature can be added that the third mould part is elongate in its moving direction, that the channel extends in lengthwise direction and has the form of a cylinder jacket over a portion of considerable length to the injection inlet, and that the first heating element is situated inside this cylinder jacket.

Easy manufacture of the third mould part is ensured with an embodiment with the characteristic that the cylinder jacket-like portion of the channel is bounded by an outer sleeve and an inner sleeve, which sleeves are held in their relative positions by spacers.

In a further variant the device has the feature that in the first mould part a second heating element is received surrounding the third mould part.

In order not to heat the first mould part unnecessarily in this embodiment and to concentrate the available heat as much as possible on the third mould part the device can display the feature that the second heating element is thermally insulated from the first mould part.

For removing a formed plastic article use can be made of openings debouching on one of the flat walls of the mould cavity for passage of pressurized gas for removing a formed article in the second position of the first and the second mould parts. In this context attention is drawn to the fact that it is usual to use a separate insert, generally designated as a stamper, on which the information is present in negative form. This stamper, a nickel disc, is fixedly held by per se known means on a flat end wall of the disc-shaped mould cavity. The blow out openings as described above debouch on the other wall of the mould cavity.

For improving the flow properties of the channel still further the device can have the feature in a particular embodiment that the walls of the channel are provided with a heat resistant anti-stick layer.

The injection mould according to the invention can also be adapted for the simultaneous manufacturing of a plurality of plastic articles with or without central holes, such as plastic lenses. In this case the central hole mentioned herein before can be considered as a free space defined by the third mould part, separating the respective articles.

BRIEF DESCRIPTION OF THE DRAWINGS

The invention will now be elucidated with reference to the annexed drawing, in which.

DETAILED DESCRIPTION OF PREFERRED EMBODIMENTS

Figure 1:
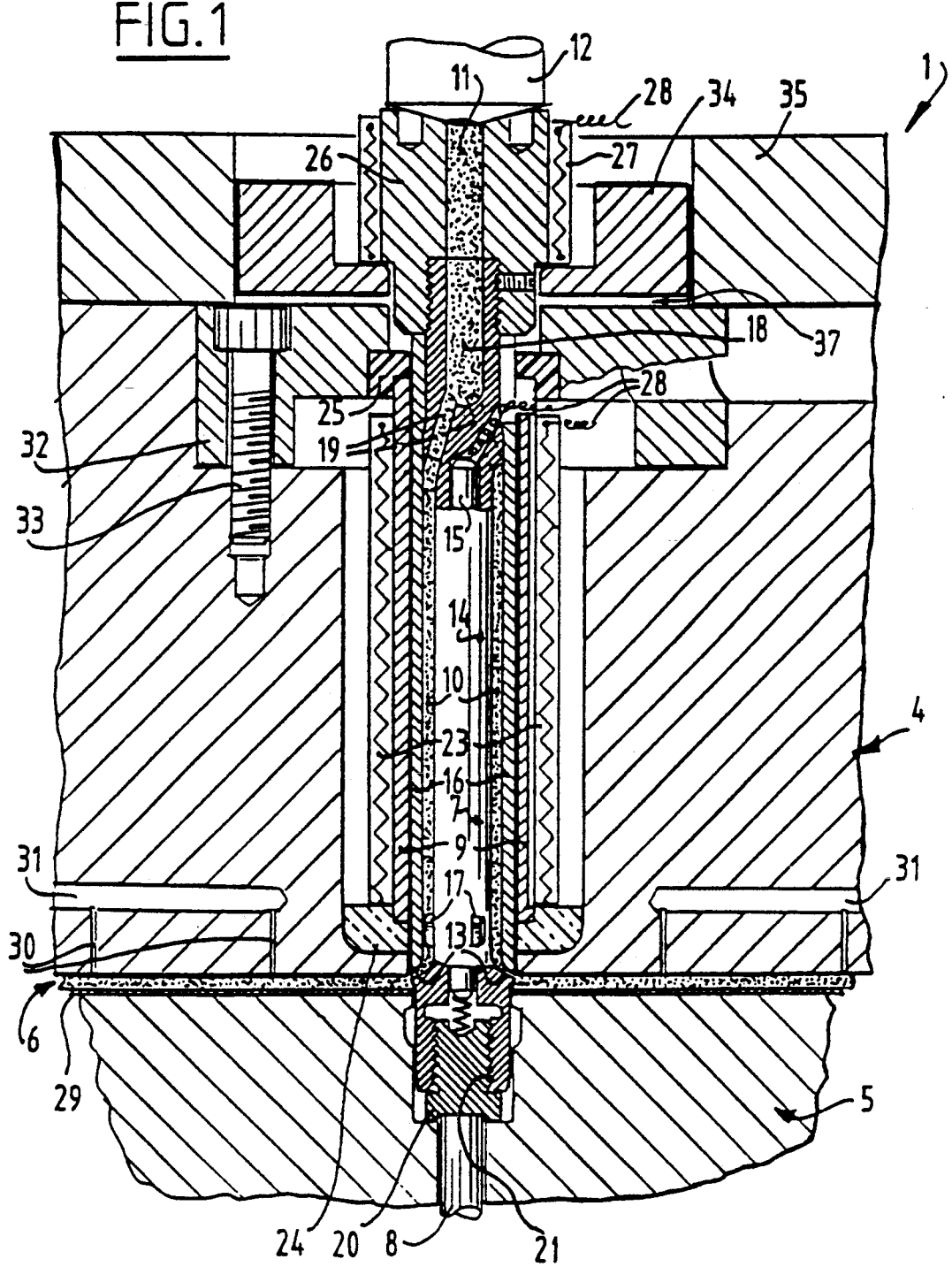
FIG. 1 shows partially in cross-section and partially in broken away perspective a view of an injection mould according to the invention in the phase wherein plastic is injected for forming a disc-shaped information carrier.

The Figures show an injection mould 1 for manufacturing a disc-shaped information carrier 2 with a central hole 3. The mould 1 comprises a first mould part 4, a second mould part 5 displaceable relative to this first mould part 4 by means of first displacing means (not shown) which two mould parts 4, 5 are displaceable between a closed first position in FIG. 1 wherein they together partially bound a disc-shaped mould cavity 6 corresponding to the shape of the information carrier 2 to be manufactured, and an open second position shown in FIG. 3 wherein the formed information carrier 2 can be taken out; a third mould part 7 which in the closed position according to FIG. 1 extends through the mould cavity 6 defined by the mould parts 4, 5 and in the region of the mould cavity 6 has a shape which corresponds to the shape of the central hole 3, which third mould part 7 is axially displaceable with the mould parts 4, 5 by means of an ejector 8 and by means of a guide sleeve 9 forming part of the first mould part 4 between the first position shown in FIG. 1, in which it partially forms a bounding of the mould cavity 6, and the second retracted position shown in FIG. 2, which third mould part bounds a cylinder jacket-like channel 10 that is connectable at the free outside end 11 to the injection nozzle 12 of an injection moulding device and at the other side debouches with an annular injection inlet opening 13 into the region of the mould cavity 6 in the first position shown in FIG. 1 of the first and the, second mould parts 4, 5 and the first position of the third mould part 7, and in the second position of the third mould part 7 debouches blind against the inside wall of the guide sleeve 9, as is shown in FIG. 2; and heating means to be described hereinafter for keeping the plastic present in the channel 10 in the plastic state.

The cylinder jacket-like channel 10 is bounded by a cylinder-shaped core 14 in which is received an elongate heating element 15 and a sleeve 16 extending therearound. The core 14 and the sleeve 16 are held at a mutual distance by means of spacers 17. At the top the core 14 has a central coaxial bore 18 which, by means of borings 19, can transport the plastic coming from the injection nozzle 12 via the free end 11 and the channel 10 to the annular injection inlet openings 13 for injection into the mould cavity 6.

Under the injection inlet opening 13 the core 14, and therewith the outside wall of the third mould part 7, has a very slightly conical tapering shape, which serves for easy release of a formed information carrier. In the Figures the conical shape is depicted somewhat exaggeratedly for the sake of clarity.

An access opening 21 closable by means of a threaded plug 20 serves for admitting the central heating element 15.

Placed in a space 22 around the third mould part 7 is a cylinder jacket-like heating element 23, which can generate its heat to the third mould part 7 via the guide sleeve 9 for keeping the plastic present therein in the plastic state. The heating element 23 and the guide sleeve 9 are supported on the underside by means of a wear-resistant carrier ring 24 of heat insulating, non-fibrous material, for example a ceramic material, titanium or plastic. At the top side the guide sleeve is carried by a wear-resistant, pressure-resistant guide ring 25.

A heating element 27 is likewise placed around a connecting block 26 between the core 14 and the injection nozzle 12.

Connecting wires of the various heating elements are generally designated with 28. These are connected to a suitable power supply.

In this embodiment a stamper 29 is situated on the flat wall of the mould cavity 6 which forms part of the second mould part 5. This is held in position by known means not shown here. Such means can be based on underpressure, magnetic forces or take a mechanical form. For removing a formed plastic article openings for blowing in air 30 are present, which are connected via lines 31 to selectively energizable compressed air means (not drawn).

Shown in the drawing are various constructional details such as a ring 32 which is connected by means of bolts 33 to the first mould part 4 and serves for positioning of the guide and carrier ring 25.

The first mould part 1 is displaceable relative to the injection nozzle 12. A carrier ring 34 is slidably guided in the frame part 35 for this purpose.

Figure 2:
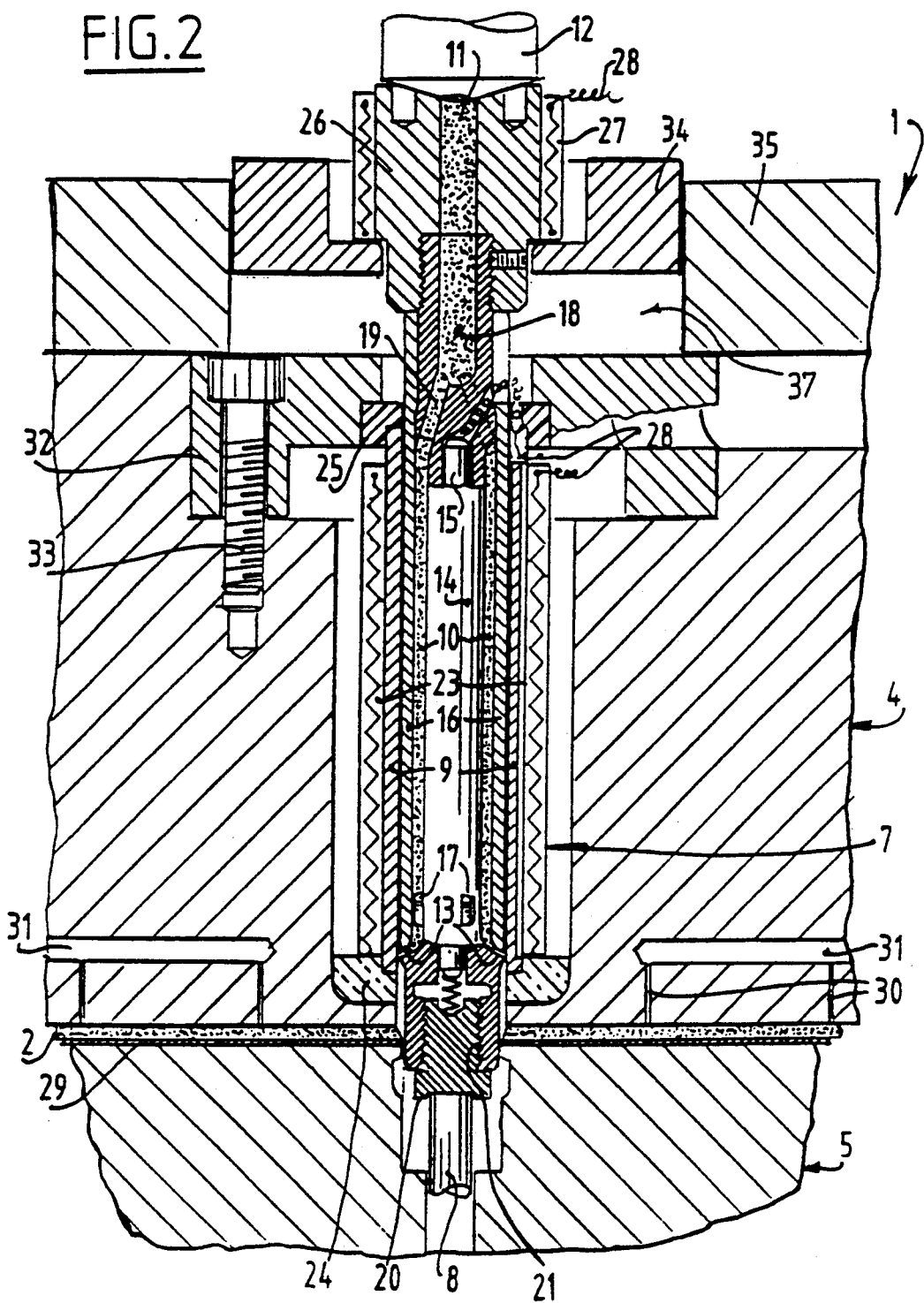
FIG. 2 shows a following operating position of the mould according to FIG. 1, wherein the third mould part is situated in a retracted position.

In the situation shown in FIG. 1 the mould 4, 5, 7 is in its operational state for injecting plastic into the mould cavity 6.

In the situation shown in FIG. 2 the third mould part 7 is moved to a retracted position by actuating the ejector 8, wherein the injection inlet opening 13 ends blindly against the inside wall of the sleeve 16.

Figure 3:
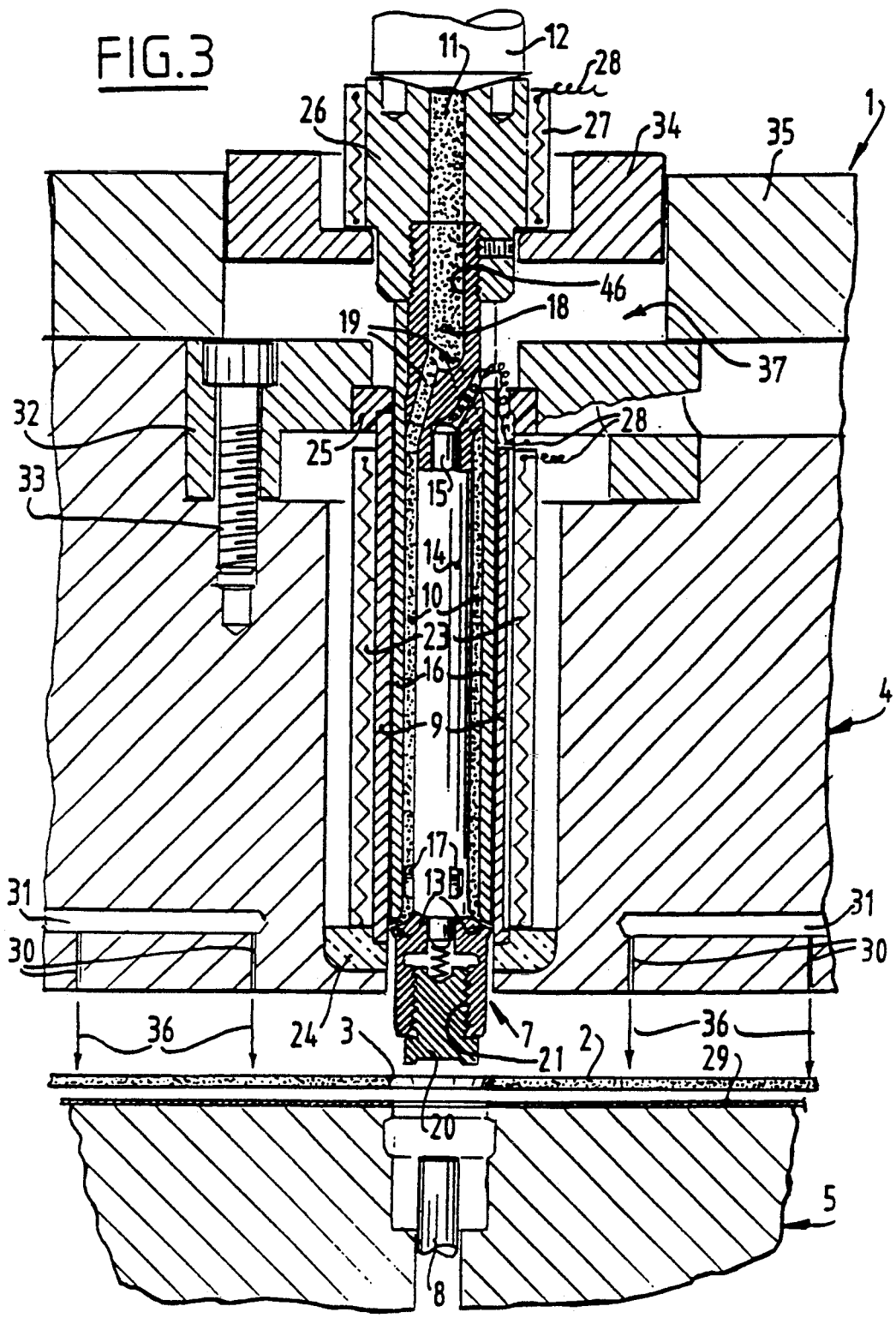
FIG. 3 shows the phase wherein the mould is opened for taking out a formed plastic article.

In the subsequent phase according to FIG. 3 the mould parts 4 and 5 are mutually separated so that the mould cavity 6 is accessible for removal of the formed information carrier 2.

Air 36 is blown through the openings 30 to remove this information carrier 2.

It will be apparent that all known and appropriate means can be used for the displacing means that provide the relative displacement of the various mould parts. Use can be made of pneumatic or hydraulic cylinders, while for retraction of the third mould part from its position shown in FIG. 1 to its position shown in FIG. 2 the ejector 8 does not necessarily have to be used, but medium under pressure can for example be admitted into the space 37 which is bounded by the first mould part 4, the frame part 35, the displaceable carrier ring 34 and the third mould part 7 with the connecting block 26. As a result of the thereby occurring pressure force a relative movement of the carrier ring 34 takes place whereby it is moved from the position shown in FIG. 1, carrying with it the third mould part 7.

The inner surface of the bores 18 and 19 and the channel 10 is provided with a heat resistant coating layer 46, shown in FIG. 3, which prevents the adhesion of heated plastic.

Figure 4:
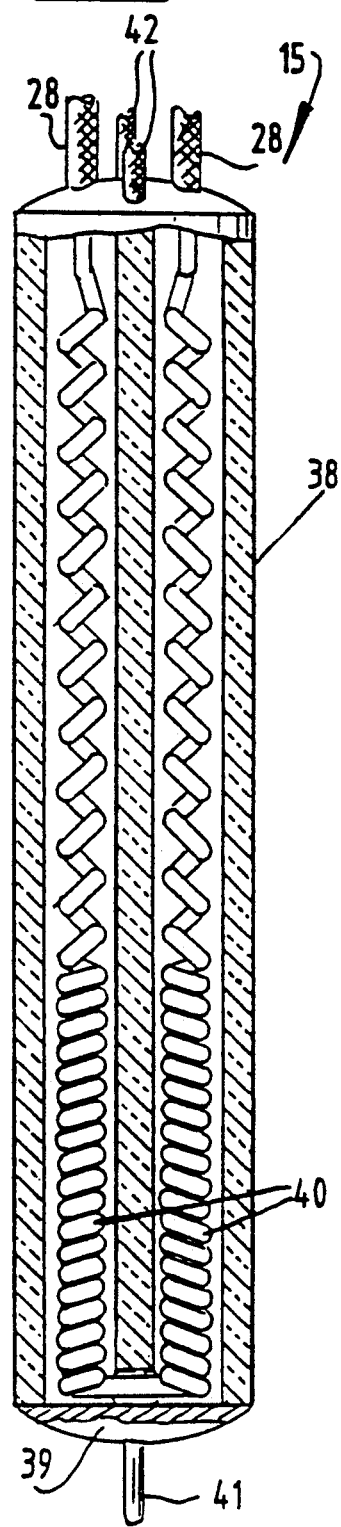
FIG. 4 shows a cross-sectional view through the central heating element according to the preceding Figure.

FIG. 4 shows the heating element 15 in detail. This heating element comprises a cylindrical body 38 which is of ceramic material and is ground to a round shape. The body 38 is closed off on the bottom with a cured mould mass 39 consisting of $Al_2O_3$.

A heating wire 40 wound in spiral shape is received internally within the body 38 and receives its power supply via wires 28. Protruding at the bottom from the sealing mass 39 is a thermocouple 41 which is connected to connecting wires 42 and serves for adjusting the power supply through the wires 28 for holding the temperature constant within determined limits.

The heating wire is embedded in $Al_2O_3$.

The wires 28 are insulated by means of a temperature-resistant sheath with glass fibres.

Figure 5:
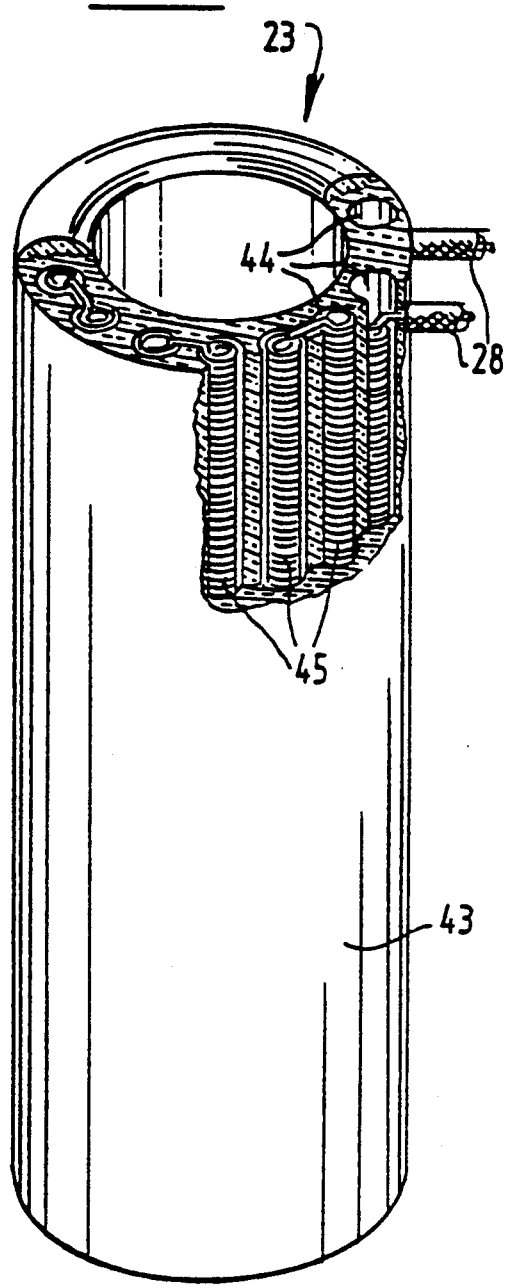
FIG. 5 is a partially broken away perspective view of the cylinder jacket-like heating element according to the FIGS. 1–3.

FIG. 5 shows the heating element 23. This comprises a cylinder jacket-like body 43 in which heating coils 45 mutually connected in series are received in lengthwise channels 44, which heating coils 45 receive their power supply from wires 28 which are insulated with a temperature-resistant sheath with glass fibres.

What is claimed is:

1. Injection mould for manufacturing disc-shaped plastic articles with a central hole, the injection mould comprising:
    (a) a first mould part;
    (b) a second mould part;
    (c) first displacing means for displacing the first mould part relative to the second mould part between a closed first position, where the first mould part and the second mould part together partially bound a mould cavity corresponding to a shape of an article to be manufactured, and an open second position where a formed article can be removed from the mould cavity;
    (d) a movable third mould part which, in the closed position of the first and second mould parts, extends through the mould cavity and has a shape in a region of the mould cavity corresponding to a shape of the central hole;
    (e) second displacing means for axially displacing the third mould part between a first position, where the third mould part partially bounds the mould cavity, and a second retracted position; wherein the second displacing means comprises an ejector and a guide sleeve, said guide sleeve having an inner wall which forms part of the first mould part and said ejector forming part of the second mould part; wherein the third mould part bounds a channel connectable at a free outside end to an injection nozzle of an injection moulding device, and at an opposite end debouches with an injection inlet into the region of the mould cavity in the first position of the first and the second mould parts and the first position of the third mould part, and in the second position of the third mould part debouches blind against the inner wall of the guide sleeve; and
    (f) heating means in said third mould part for keeping plastic present in the channel in a plastic state, and the third mould part having a slightly conical tapering shape in the region of the mould cavity to allow for easy release of the article during movement of the third mould part from the first to the second position.

2. Injection mould as claimed in claim 1 wherein the injection inlet comprises a plurality of peripherally arranged injection inlet openings.

3. Injection mould as claimed in claim 1 wherein the injection inlet comprises an injection inlet opening extending around a periphery of the third mould part.

4. Injection mould as claimed in claim 1 wherein the third mould part comprises a first heating element.

5. Injection mould as claimed in claim 4 wherein the third mould part is elongate in its direction of axial movement; wherein the channel extends in a lengthwise direction and is formed between an outer sleeve and an inner core; and wherein the first heating element is disposed within the inner core.

6. Injection mould as claimed in claim 5 wherein the inner core and outer sleeve are held in relative position by spacers.

7. Injection mould as claimed in claim 5 wherein a second heating element enclosing the third mould part is accommodated in the first mould part.

8. Injection mould as claimed in claim 7 wherein the second heating element is thermally insulated from the first mould part.

9. Injection mould as claimed in claim 1 wherein openings are disposed on a wall of the mould cavity for passage of pressurized gas for removing a formed article in the second position of the first and the second mould parts.

10. Injection mould as claimed in claim 1 wherein the channel includes walls provided with a heat resistant anti-stick layer.

* * * * *